United States Patent
Basson et al.

(10) Patent No.: US 7,792,820 B2
(45) Date of Patent: *Sep. 7, 2010

(54) SYSTEM FOR INTELLIGENT CONSUMER EARCONS

(75) Inventors: Sara H. Basson, White Plains, NY (US);
Ramesh Gopinath, Millwood, NY (US);
Dimitri Kanevsky, Ossining, NY (US);
Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/860,868

(22) Filed: Sep. 25, 2007

(65) Prior Publication Data

US 2009/0081995 A1     Mar. 26, 2009

(51) Int. Cl.
*G06F 7/00* (2006.01)
*G06F 17/30* (2006.01)

(52) U.S. Cl. .......................... 707/713; 725/34

(58) Field of Classification Search ........................ None
See application file for complete search history.

(56) References Cited

U.S. PATENT DOCUMENTS

| | | | |
|---|---|---|---|
| 6,084,628 A | 7/2000 | Sawyer | |
| 6,246,985 B1 | 6/2001 | Kanevsky et al. | |
| 6,411,683 B1 | 6/2002 | Goldberg et al. | |
| 6,792,339 B2 | 9/2004 | Basson et al. | |
| 6,856,673 B1 | 2/2005 | Banks et al. | |
| 6,868,384 B2 | 3/2005 | Parus et al. | |
| 7,234,065 B2 | 6/2007 | Breslin et al. | |
| 7,249,045 B2 * | 7/2007 | Lauffer | 705/8 |
| 2002/0103647 A1 | 8/2002 | Houplain | |
| 2004/0008828 A1 | 1/2004 | Coles et al. | |
| 2004/0247092 A1 | 12/2004 | Timmins et al. | |
| 2005/0192730 A1 | 9/2005 | Churchill et al. | |
| 2006/0040710 A1 | 2/2006 | Ruetschi et al. | |
| 2006/0041828 A1 | 2/2006 | King et al. | |
| 2006/0190822 A1 | 8/2006 | Basson et al. | |
| 2007/0015517 A1 | 1/2007 | Casey | |

* cited by examiner

*Primary Examiner*—Uyen T. Le
(74) *Attorney, Agent, or Firm*—Cantor Colburn LLP; Ronald Kaschak (57) ABSTRACT

A system for implementing intelligent consumer earcons, includes: one or more communication devices for carrying out conversations between users and for playing of earcons; one or more tracking and monitoring devices; one or more servers configured with software for implementing the earcons; one or more storage devices for storing a database of earcons, and for storing user profile and preference databases; one or more networks configured for signal communication between the communication devices, the tracking and monitoring devices, the servers, and the storage devices; wherein the monitoring devices are configured to monitor the user, user audio content, and the user's environment; wherein the earcons are chosen from the database of earcons based on the user profile and preferences database; and wherein the playing of individual earcons from the database of earcons is based on the monitored user audio content and environment.

15 Claims, 7 Drawing Sheets

SYSTEM FOR INTELLIGENT CONSUMER EARCONS

CROSS REFERENCE TO RELATED APPLICATIONS

The present application is co-pending with the concurrently filed application, Ser. No. 11/860,868, entitled "SYSTEM FOR INTELLIGENT CONSUMER EARCONS," and filed on Sep. 25, 2007, assigned to the assignee of the present application, the contents of which are incorporated herein by reference in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to earcons, and more particularly to a system for providing intelligent consumer earcons to mobile and fixed landline communication subscribers.

2. Description of the Related Art

Earcons are auditory icons. Earcons are sounds or tones used to represent a specific event, item, or object. An earcon can be parameterized by specific attributes of the item or event. Earcons also employ sound cues about the content and organization of information. Earcons are generally not auditory caricatures of the signified item or event, that is, they are abstract rhythmic/melodic patterns rather than everyday sounds.

The utilization of earcons or non-speech audio with various user-interfaces is becoming increasingly popular due to the potential benefits earcons offer. An earcon is a useful complement to visual output, because earcons can increase the amount of information communicated to the user, or reduce the amount of information the user has to receive through the visual channel. Earcons make use of the auditory senses, which is powerful but under-utilized sense in most current interfaces.

Earcons are commonly utilized in automobiles, consumer electronics, computers, and communication applications. For example, the sounds a driver hears when leaving the car lights on or the key in the ignition are earcons. Further examples of earcon usage are user audio prompts, such as when a person is prompted to leave a message after the "beep", interactive and automated phone services, or to withdraw their cash at an automated transaction machine with auditory cues.

SUMMARY OF THE INVENTION

Embodiments of the present invention include a system for utilizing earcons, the system includes: one or more communication devices for carrying out conversations between users and for playing of earcons; one or more tracking and monitoring devices; one or more servers configured with software for implementing the earcons; one or more storage devices for storing a database of earcons, and for storing user profile and preference databases; one or more networks configured for signal communication between the communication devices, the tracking and monitoring devices, the servers, and the storage devices; wherein the monitoring devices are configured to monitor the user, user audio content, and the user's environment; wherein the earcons are chosen from the database of earcons based on the user profile and preferences database; and wherein the playing of individual earcons from the database of earcons is based on the monitored user audio content and environment.

In one aspect of the invention, the database of earcons is comprised of at least one of the following: company, product, service, retail location, and earcon length information. The user profile and preferences database is comprised of user and observationally supplied user profile information. In addition, the user profile and preferences database is comprised of user biometric data, wherein the user biometric data comprises gender of the user; age of the user; accent of the user; native language of the user; dialect of the user; socioeconomic classification of the user; educational level of the user; and emotional state of the user. The user profile and preferences database is also comprised of user preferences, wherein the user preferences comprise the types of companies, products, services the user wants to receive earcons about; and wherein the user preferences further comprise specified audio levels, lengths, and points in the usage of the communication device and the conversation for playing the earcons.

In another aspect of the invention, the monitoring devices that are used to analyze user audio content utilizes speech recognition to detect and interpret conversational content, wherein based on the interpreted conversational content earcons are chosen for playback on the user's communications device. In addition, the monitoring of user audio content is used to determine pauses in the user's conversation, wherein based on the determined pauses and their respective length, earcons are chosen for playback on the user's communications device.

In another aspect of the invention, the monitoring of the user environment comprises tracking the location of the user, wherein the tracking of user location comprises the use of at least one of the following: global positioning system (GPS) satellites and related electronic device chip sets within the communication devices, cellular phone infrastructure, and Internet gateways. Wherein based on the user location an earcon is chosen for playback on the user's communications device.

In another aspect of the invention, the communication devices comprise cellular phones, fixed landline phone, mobile computing devices, and desktop computers, wherein the cellular phones, the mobile computing devices, and the desktop computers are configured with voice over Internet protocol (VOIP).

An article comprising one or more computer-readable storage media containing instructions that when executed enable a computer to implement a method of implementing an earcon; wherein the method further comprises: forming a database of earcons; forming a user profile and preferences database; monitoring user audio content; monitoring user environment; playing a series of earcons from the database of earcons on a user's communication device; wherein the series of earcons are chosen from the database of earcons based on the user profile and preferences database; and wherein the playing of individual earcons from the series of earcons is based on the monitored user audio content and environment.

TECHNICAL EFFECTS

As a result of the summarized invention, a solution is technically achieved for a method, system, and article for utilizing intelligent consumer earcons (ICE) that detect the audio surroundings of a user on a communications device, and based on detected audio information plays earcons of companies and businesses.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention provide a method and system for utilizing intelligent consumer earcons (ICE) that detect the audio surroundings of a user on a communications device, and based on detected audio information play earcons related to companies and businesses. In an exemplary application of an embodiment of the invention, when a user is discussing a company, product, or service offered by the company on their communications device, a speech recognition system detects and interprets the conversational content, and plays a sound that will remind the user of the company. However, it is important to note that the sound played does not interfere in the user's conversation and acts as a quiet advertising reminder. In embodiments of the invention, control of the introduction of earcons to the user's conversation may be accomplished by creating a user profile (e.g., age, sex, income and preferences for volume levels and which companies the user wishes to receive advertisements from. In embodiments of the invention, earcons may also be created to inform the user of information related to both their discussion and the company from which they are receiving advertisement. For example, if a user is on their communication device discussing a new consumer device, the ICE system may play a company earcon informing the user of a newer consumer device just released, by playing an earcon the user can identify as "new product available."

In embodiments of the invention ICE systems are also utilized to assist a consumer in locating a store or company location by using the global positioning satellite (GPS) system. For example, if a user is on a communication device discussing a brand of coffee, the coffee brand earcon will play, and then an earcon indicating that the brands coffee shop is nearby will follow. Embodiments of the invention have earcons that may be adjusted to the user's preferences. The user can be informed with a simple "beep" when a store is near, or various different sounds, with different rhythms that may indicate direction and proximity. The user's location is tracked using GPS and then correlated with the nearest company or store the user is discussing.

In another embodiment of the invention, the ICE system may be utilized to search for another person. People often identify their location by using local stores or companies as landmarks. The ICE system can help people find each other and also provide valuable advertising opportunities. For example, if a person is looking for a friend who says they are near a certain store in a busy urban intersection. The ICE system recognizes the name of the store and plays the store's earcon, and then a subsequent earcon that indicates the proximity of the nearest store.

Figure 1:
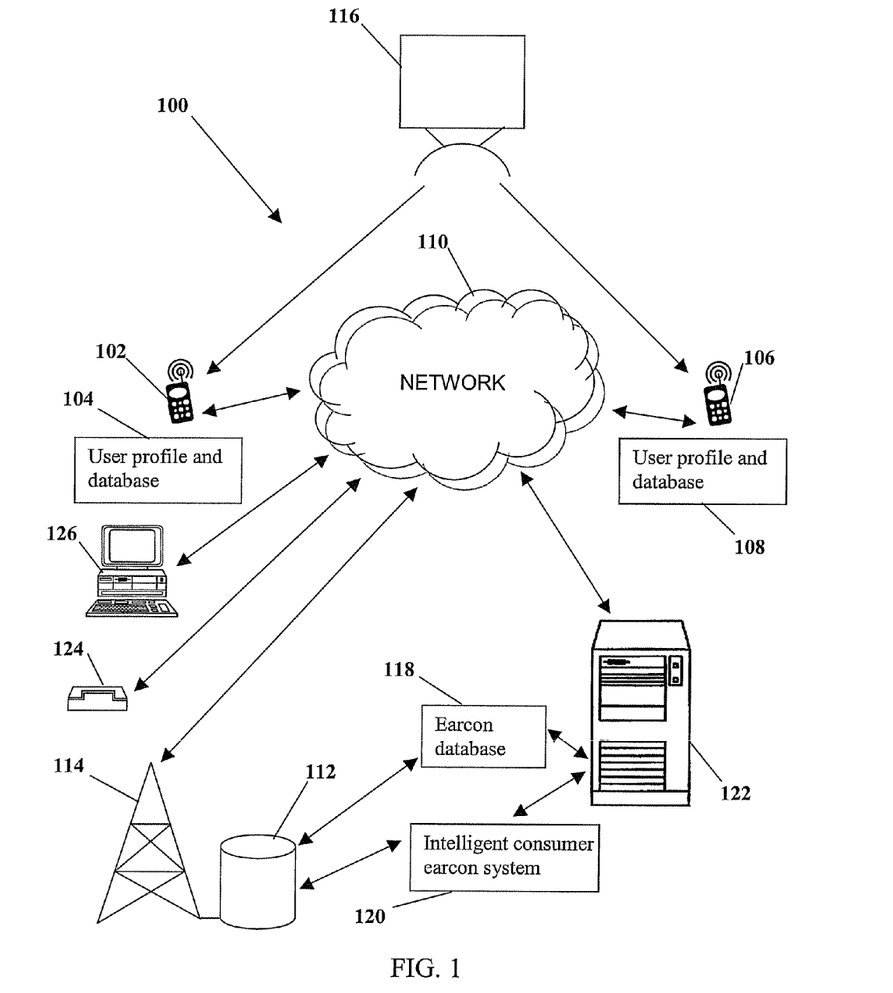
FIG. 1 illustrates a system for implementing an intelligent earcon system according to embodiments of the invention.

FIG. 1 illustrates an exemplary system 100 for implementing an intelligent earcon (ICE) system 120 according to embodiments of the invention. The system 100 includes mobile communication devices (102, 106), fixed landline phones 124, and desktop computer devices 126 configured with voice over Internet protocol (VOIP). The mobile communication devices (102, 104) are wirelessly connected to a network 110. The network 110 may be any type of known network including a fixed wire line network, local area network (LAN), wide area network (WAN), global network (e.g., Internet), intranet, etc. with data/Internet capabilities as represented by server 122. Communication aspects of the network are represented by cellular base station 112 and antenna 114.

User profiles and databases (blocks 104, 108) for requesting and controlling earcon content may be resident on the individual communication devices (102, 104, 124, 126) or stored within the server 122 or cellular base station 112. The software for running the intelligent earcon system (block 120), and a database of available earcons (block 118) may be resident on the server 122 or cellular base station 112.

Location information for implementing positional aspects of the intelligent earcon system may be obtained via global positioning system (GPS) satellites 116 and related electronic device chip sets within the mobile communication devices (102, 104), or via terrestrial infrastructure such as the cellular phone system (112, 114), or Internet gateways. Methods such as triangulating an RF transmission between cell sites (112, 114) have proven effective in locating a transmitting device. In a wireless local area network (WLAN), the Internet gateway and the associated Internet protocol (IP) address may be used to locate the mobile communication devices (102, 104).

An example of utilizing the exemplary system 100 for implementing an intelligent earcon system is as follows. A first subscribing user places a call with their mobile communication device 102 to a second subscribing user with mobile communications device 106. Both of the subscribing users have their own user profile and database (blocks 104, 108), which contain information on the user's preferences for earcons and basic information on the user. The first subscribing user (represented by mobile communications device 102) may only wish to receive earcons from a specified service provider, and wishes to be informed of new products and store locations regularly. The second subscribing user (represented by mobile communications device 106) may only wish to receive earcons from a specified coffee provider and wishes to be informed of store locations and exact directions by earcon when prompted through speech recognition. The ICE system 120 is linked to both users (102, 106), and actively monitors their conversation in order to include appropriate earcons from the earcon database 118, based on the individual user profiles (104, 108). The users (102, 106) are tracked using GPS 116 to facilitate the ICE system 120 in informing the user of store locations with the appropriate earcon.

Figure 2:
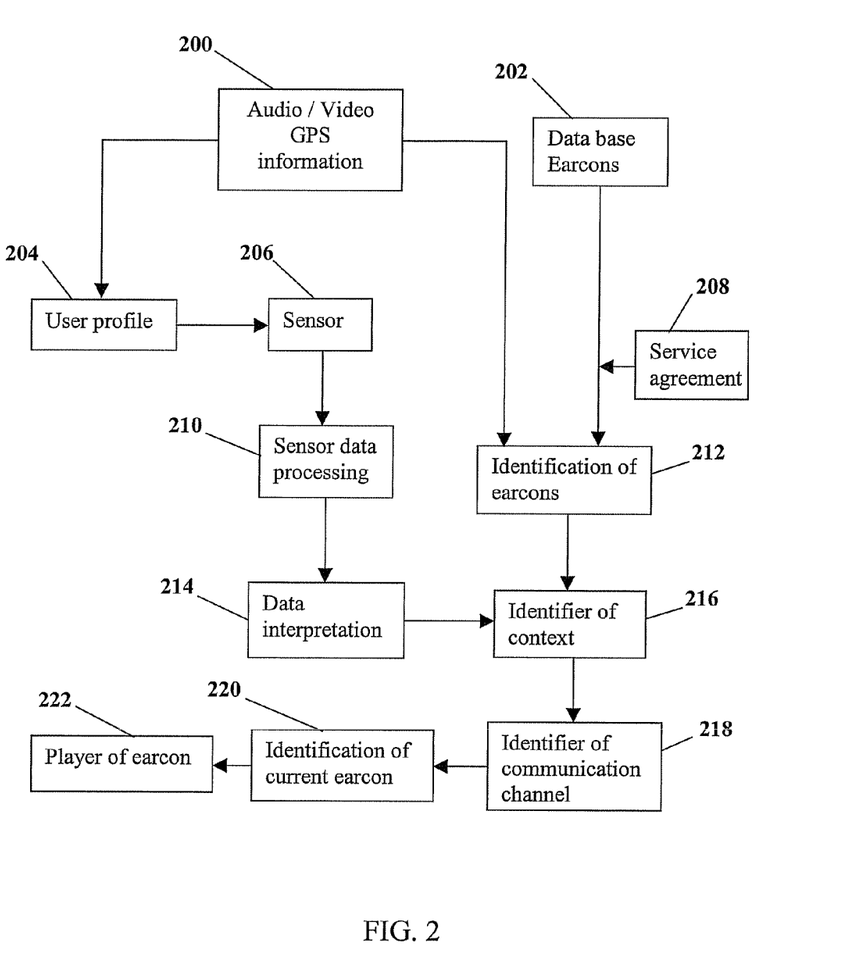
FIG. 2 is an operational block diagram for implementing intelligent earcon systems according to embodiments of the invention.

FIG. 2 is an operational block diagram for implementing intelligent earcon system according to embodiments of the invention. Audio/video (A/V) data and positional data (e.g., GPS, RF triangulation, IP identification) (block 200), user profile and preferences (block 204), and other sensor data (e.g., microphone, camera, user biometrics) (block 206) are supplied to a sensor data processor (block 210) for processing of the raw data. During data interpretation (block 214), positional data is correlated with information obtained from the audio and/or visual data. For example, a user says, "I want to drink coffee." The data interpretation system uses audio/GPS correlation to identify a location to buy coffee.

The database of earcons (block 202) contains information about the various earcons within the earcon system, and tracks which earcon corresponds to which company and their products and services. The service agreement database (block 208) contains information about which company allows the use of their earcons. The service agreement database (block 208) also contains information about privacy and legal conditions. The identification of earcons (block 212) identifies pertinent earcons based on audio/video (A/V) data and positional data (block 200) and service agreement (block 208) from the database of earcons (block 202). The appropriate context for presenting the earcon is determined by the identifier of context (block 216) based on the interpretation of the data (block 214). The identification of the earcon communication channel (block 218) is based on the determined context (block 216). For example, earcons may be communicated via ring-tones. The identifier of the communication channel (block 218) determines when earcons may be communicated (during natural pauses and silence, or as background music). The identification of current earcon (block 220) identifies earcons that fit a given situation by duration, context and by the user profile. Finally, the earcon is played (block 222) for the user.

Figure 3:
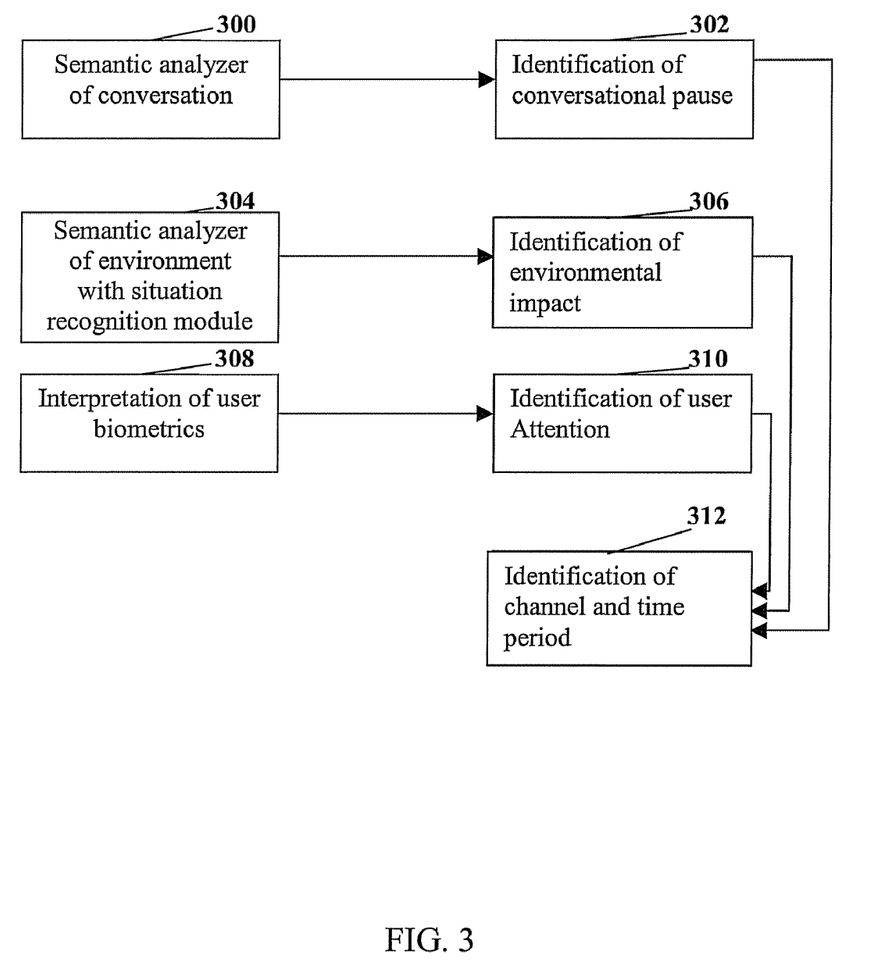
FIG. 3 is a detailed operational block diagram for the identification of the communication channel (block 218 of FIG. 2) according to embodiments of the invention.

FIG. 3 is a detailed operational block diagram for the identification of the communication channel (block 218 of FIG. 2) according to embodiments of the invention. The semantic analyzer of conversation (block 300) interprets the semantic content of each input phrase. One example how the semantic analyzer (block 300) interprets semantic content is to syntactically parse words and phrases in each input and associated semantic classes. For example, the semantic analyzer (block 300) interprets one word received from a syntax parser as a VERB PHRASE, and then finds a class of words associated with that given verb. Similarly, the semantic analyzer (block 300) interprets other words that are a NOUN PHRASE or other grammatical PHRASES. A set of associated phrases provides semantic representation of the textual phrase.

The semantic analyzer (block 300) defines a general category where the given semantic content occurs. For example, if the semantic content is relating to a question/answer such as: "I love to drink cola?" "We need to stop and buy it"—the situation category can be expressed as "DRINKING." Similarly any phrases about love, meetings with girlfriends, etc. may be expressed as the situation "SEX." Phrases about children, wife, husband, mother or father may be expressed as the situation "FAMILY" or the content may be more in-depth, such as FAMILY-MEETING-YEAR-1996 in a given year (e.g., was 1996 a very significant year from the perspective of family life). The semantic representation of the phrase is used to define conversational pauses. For example, semantic representations may define that the topic of the conversation is switched. If there is also a prolonged silence then this means that this silence coincides with the end of one topic of conversation and a new topic is not yet started. The semantic analyzer (block 300) is capable of recognizing such phrases as "Please, wait, I will find a telephone number". This creates a natural conversation pause.

In addition, the identification of conversational pauses/silence (block 302) may also be accomplished with a tonal and inflection analyzer that analyzes speech to detect ends of sentences (punctuation), and assists in the identification of conversational pauses.

A semantic analyzer of the environment (block 304) employs a situation recognition module that uses known recognition technologies in all possible media such as speech recognition, image recognition and pattern recognition. The situation recognition module produces strings of units (labels) that have semantic meaning (like words from speech). A statistical parser that permits the attachment of syntactic structures to these strings processes these strings of units. Then, in the process of interpretation, strings of units get semantic meanings that "explain" situations and environment. Examples of environments that the system may recognize are:

A person speaks in a car

It is very hot summer

This is a conference call where several people participate a caller is walking on a noisy street, etc.

Examples of a semantic analyzer of environment (block 304) with a situation recognition module are provided in U.S. Pat. No. 6,792,339 entitled "Artificial Passenger with Condition Sensors," and is also described in patent application publication U.S. 20050192730 entitled "Driver Safety Manager" which are both hereby incorporated by reference herein in their entirety. The in-vehicle applications of the semantic analyzer may be readily extended to other environments.

An identification of environmental impact module (block 306) identifies the impact of environment on a user and their conversation. The identification of environmental impact is done by a set of rules that associate with each situation and environment a set of possible consequences of this environment on the user and their conversation. For example, if a person is driving, there can be natural pauses because the driver pays attention to their driving and not because of their conversation, and therefore the driver should not be distracted with earcons. The preceding example defines a rule to check for driver attention if there is a conversational pause. Driver attention may be defined as found in U.S. Pat. No. 6,792,339 and patent publication U.S. 20050192730A1. If a user is on a noisy street then the rule may either require the suspension of earcon usage, or require the selection of earcons that may be comprehended in noisy environments.

The interpretation of user biometrics (block 308) is based on the detection and definition of user biometrics. Examples of user biometrics include: gender of the user; age of the user; accent of the user; native language of the user; dialect of the user; socioeconomic classification of the user; educational level of the user; and emotional state of the user. The user biometrics may be used to choose an appropriate earcon. For example, the educational level of the user may determine the types of earcons that are targeted for them. The dialect of a user may be used to present earcons oriented to places where user came from. Detection and definition of user biometrics is disclosed in U.S. Pat. No. 6,665,644 entitled "Conversational Data Mining," and is incorporated by reference herein in its entirety.

The identification of user attention (block 310) is based on the user biometrics as described in U.S. Pat. No. 6,792,339 and patent publication U.S. 20050192730A1.

The identification of a channel and appropriate time period to insert and play an earcon (block 312) is determined from the inputs obtained from the identification of conversational pauses/silence (block 302), the identification of environmental impact module (block 306), and the identification of user attention (block 310), as well as a set of rules. For example, if a long pause is expected while a teenage user speaks over a mobile communication device, and the teenage user is located near a bookstore, and the teenage user is an avid reader of a specific series of books, and there is a new book in that series, an earcon for the new book may be played. The rules can be provided in a form of statistical machine, and have a set of rules for prediction of user behavior and reaction as described in U.S. Pat. No. 4,870,579 entitled "System and Method of Predicting Subjective Reactions", incorporated by reference herein in its entirety. An advanced technique for prediction of situations is described in U.S. patent application publication 20060190822A1 entitled "Predictive User Modeling in User Interface Design", incorporated by reference herein in its entirety.

Figure 4:
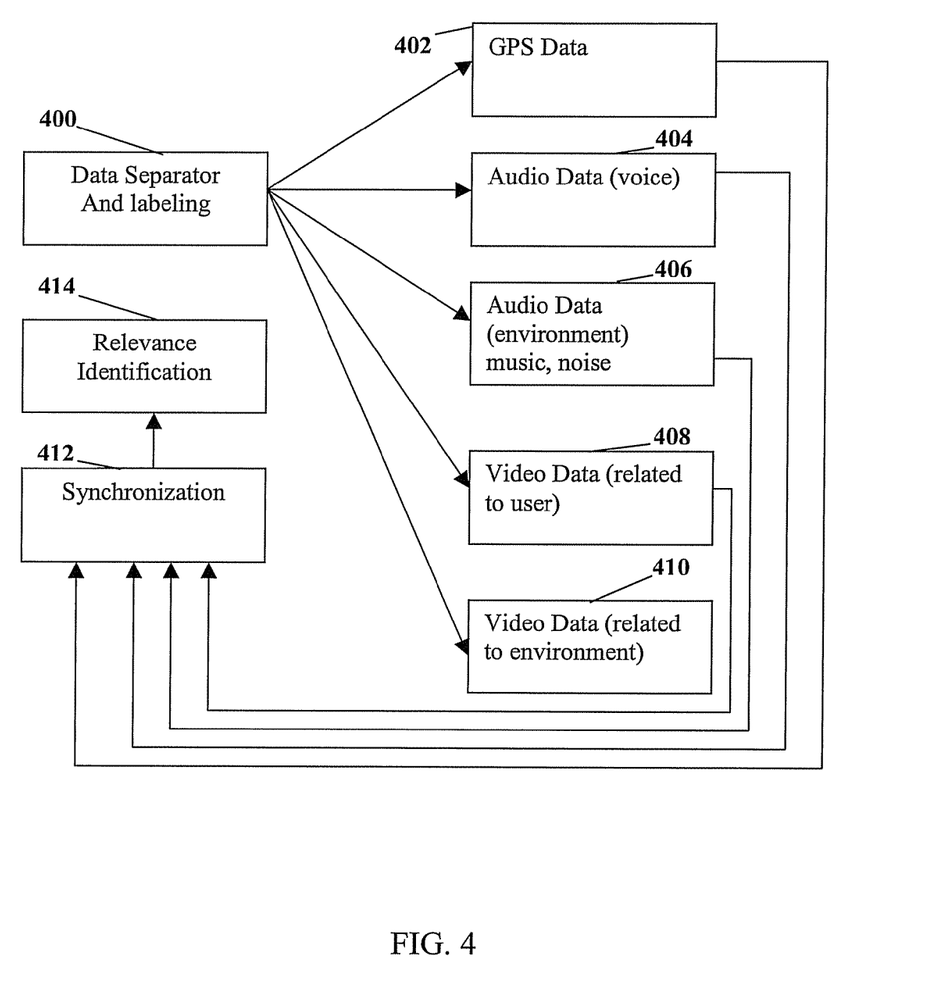
FIG. 4 is a detailed operational block diagram for sensor processing (block 210 of FIG. 2) and data interpretation (block 214 of FIG. 2) according to embodiments of the invention.

FIG. 4 is a detailed operational block diagram for sensor processing (block 210 of FIG. 2) and data interpretation (block 214 of FIG. 2) according to embodiments of the invention. A data separator and labeling module (block 400) labels data, such as GPS data (block 402), voice audio data (block 404). There are various techniques available to identify and separate media, and label Data that is identified via sensors that receive it (e.g., data from microphones is audio, and data from cameras is video). Other more sophisticated examples of media identification techniques are described in U.S. Pat. No. 6,246,985 entitled "Method and Apparatus for Automatic Segregation and Routing of Signals of Different Origins by Using Prototypes", incorporated by reference herein in its entirety. The types of media include: audio related to a user (e.g., user voice) (block 404), audio environment data (music, background noise) (block 406), video data (related to the user) (block 408) that shows the user—the type of activity they are engaged in, their facial features (this can be used to define user video biometrics such as age, sex, etc.), and video data related to the environment (block 410). The video data related to the environment (block 410) shows the surrounding of the user, such as a street location, or a car where the user is located.

The synchronization block 412 gathers the data from the data sources (blocks 402, 404, 406, 408, 410), and synchronizes the data using time stamps. A relevance determination module (block 414) determines the relevancy of the synchronized data. For example, the relevance determination module (block 414) establishes that video of a car that passes a user and a street noise are related—the noise comes from this car. The synchronization is required for the semantic processing that was described in FIG. 3 and for deriving rules for how and when to do earcons. For example, under noisy conditions earcons will be played louder for a user.

Figure 5:
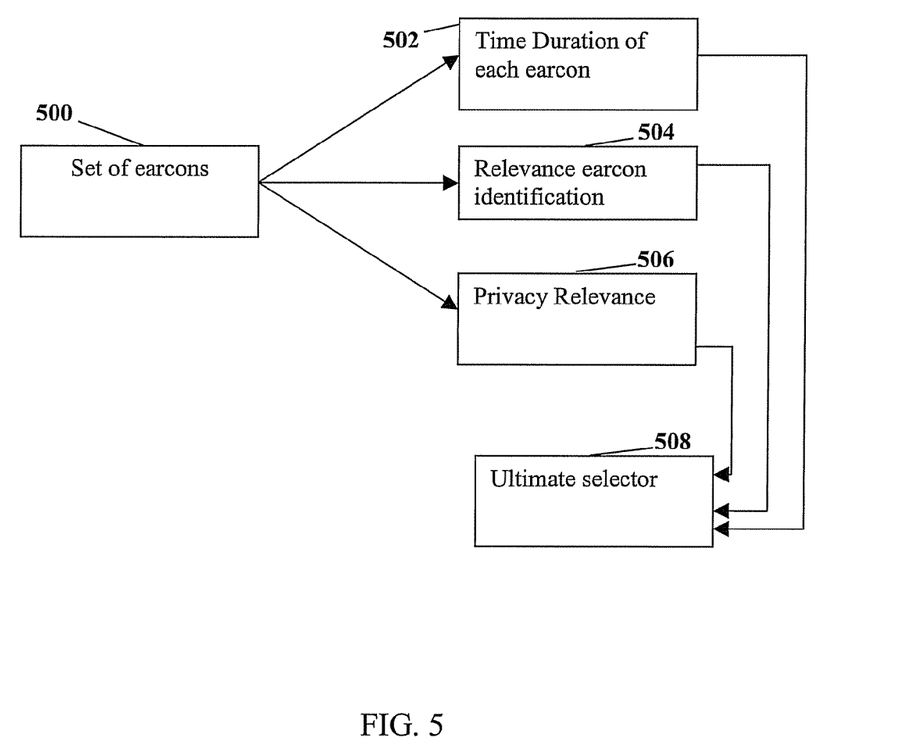
FIG. 5 is a detailed operational block diagram for identification of the current earcon (block 220 of FIG. 2) according to embodiments of the invention.

FIG. 5 is a detailed operational block diagram for identification of the current earcon (block 220 of FIG. 2) according to embodiments of the invention. A set of earcons (block 500) is a module that stores a set of descriptions of available earcons for participating companies, company related advertisements and other situational information. The set of earcons (block 500) also stores where such earcons are located and how they may be received. The situational information about the various earcons is employed to identify what earcon to use in what situation. Some examples of earcon characteristics are provided in blocks 502, 504, and 506.

Block 502 provides information about earcon time duration. Specifically, short duration earcons that may be played during a few seconds, and long duration earcons that may be played for longer periods of time up to several minutes. Block 504 identifies the relevancy of earcons from the set of earcons (block 500) to a current user situation. Examples of determinations of relevancy include: how relevant the earcons are to the available channel and time period, how relevant the earcons are to the topic that the user is discussing, relevancy of earcons to the environment where the user is located, the expected length of pauses in a conversation, user attitude, etc. Block 506 checks for privacy relevance, and verifies that an earcon that is played does not intrude user privacy. For example, if the earcon has the potential to be overheard by other users, the earcon is checked so that it does not disclosure disclose user intent or user interests. Examples of techniques for managing privacy information are given in U.S. Pat. No. 7,234,065 entitled "System and Method for Managing Data Privacy", incorporated by reference herein in its entirety. Block 508 is an ultimate selector of earcons based on information provided by blocks 502, 504, and 506. The ultimate selector (block 508) chooses the earcon that best matches all restrictions that were identified in blocks 502, 504, and 506. The ultimate selector (block 508) uses scores of importance to rank each factor provided by blocks 502, 504, and 506, and chooses the available earcon with highest score.

Figure 6:
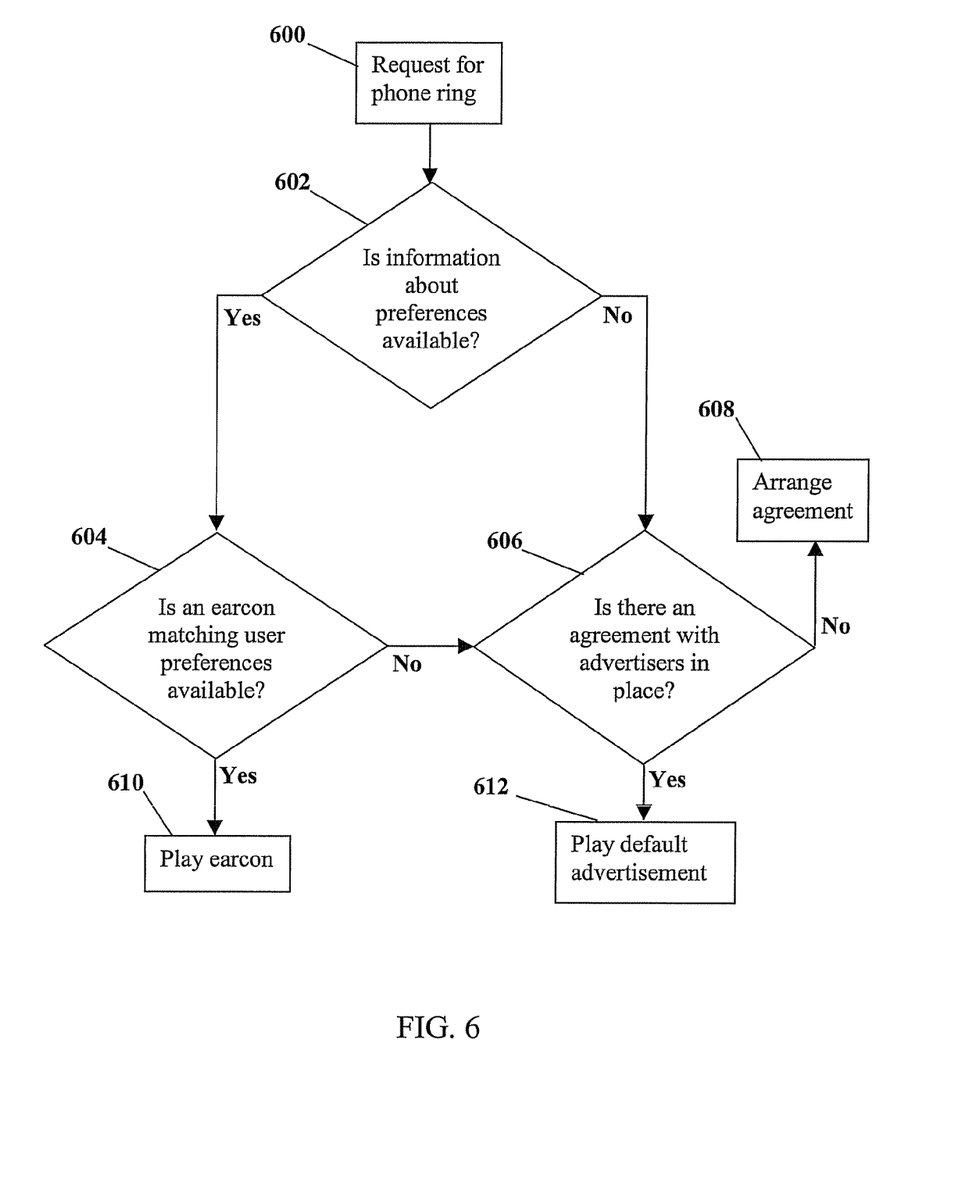
FIG. 6 is flow chart for choosing and playing an earcon on a communication device during the ring cycle according to an embodiment of the invention.

FIG. 6 is flow chart for choosing and playing an earcon on a communication device during the ring cycle according to an embodiment of the invention. The ring cycle starts with a first user's communications device request for a ring signal (block 600) on second user's communications device to initiate a conversation. If there is available information about first user preferences with regards to earcons (decision block 602 is Yes), and there is an earcon that matches the first user preferences (decision block 604 is Yes) the appropriate earcon is played (block 610) for the first user. If there are first user preferences (decision block 602 is Yes), but there are no earcons matching the first user preferences (decision block 604 is No), a check is made for advertisers with agreements for playing earcons that are in place (decision block 606 is Yes), and a default advertisement is played during the ring cycle (block 612) for the first user. If there are no first user preferences (decision block 602 is No), and there is an advertiser agreement (decision block 606 is Yes), a default advertisement is played (block 612) for the first user during the ring cycle. If no advertising agreement is in place (decision block 606 is No), an agreement between communication service providers and advertisers needs to be arranged (block 608), and the first user only hears a ring signal on their communication device.

Figure 7:
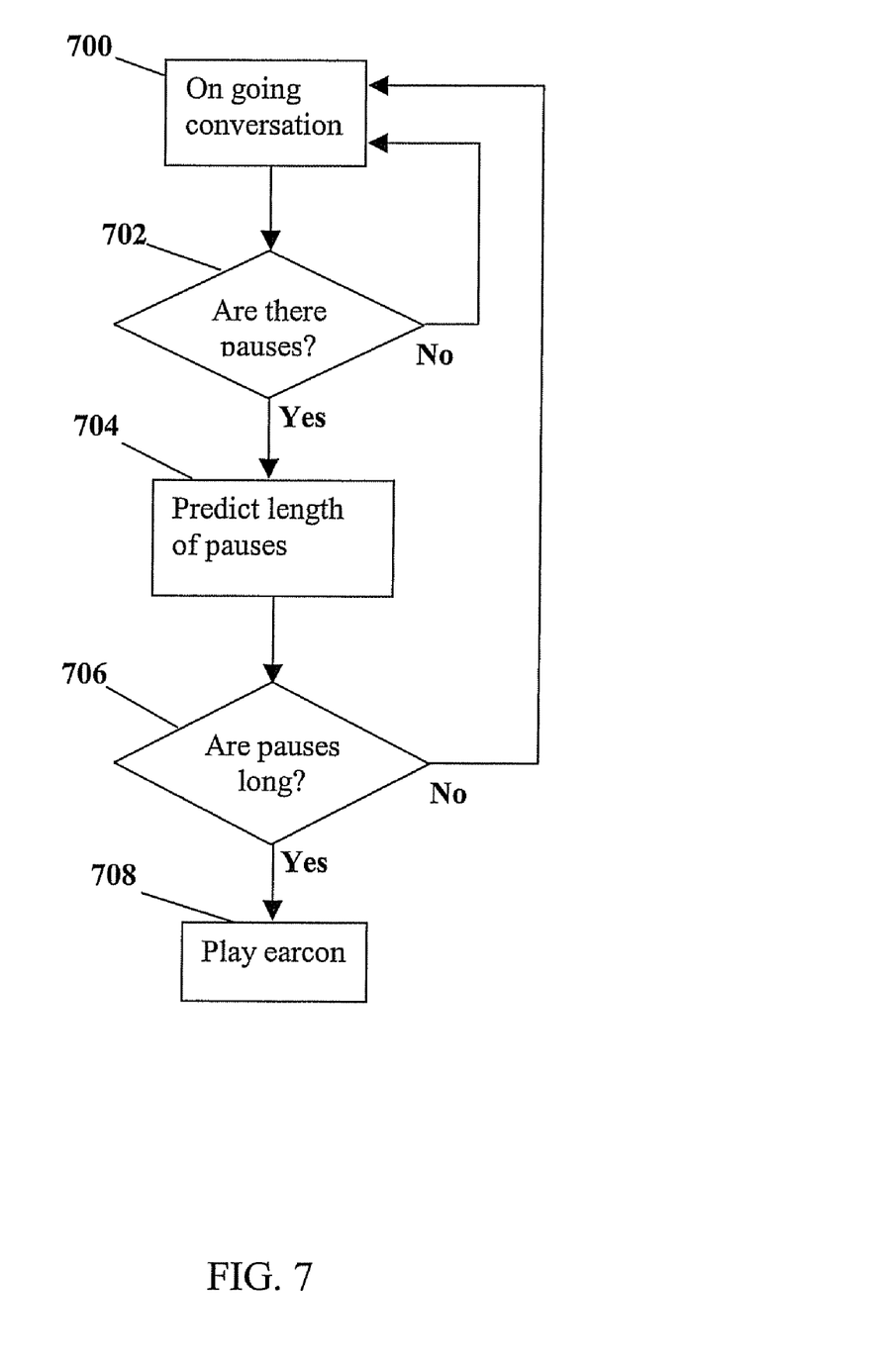
FIG. 7 is a flow chart for playing earcons during ring cycle pauses according to embodiments of the invention.

FIG. 7 is a flow chart for playing earcons during conversation pauses according to embodiments of the invention. During a conversation between a first user and a second user (block 700), the intelligent earcon system 120 of FIG. 1 determines if there are pauses (decision block 702). If there are pauses in the conversation (decision block 702 is Yes), a prediction of the length of the pauses is made (block 704), and if the pauses are deemed long enough (decision block 706 is Yes) an earcon is played (block 708) for the first user. If there are no pauses in the conversation (decision block 702 is No), or the pauses are too short (decision block 706 is No) the conversation continues (block 700) without earcons.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

That which is claimed is:

1. A system for implementing intelligent consumer earcons, the system comprising:
   one or more communication devices for carrying out conversations between users and for playing of earcons;
   one or more tracking and monitoring devices configured to monitor the user, user audio content, and the user's environment;
   one or more servers configured with software for implementing the earcons;
   one or more storage devices for storing a database of earcons, and for storing user profile and preference databases;
   one or more networks configured for signal communication between the communication devices, the tracking and monitoring devices, the servers, and the storage devices;
   wherein the earcons are chosen from the database of earcons based on the user profile and preferences database; and
   wherein the playing of individual earcons from the database of earcons is based on the monitored user audio content and environment.

2. The system of claim 1, wherein the database of earcons is comprised of at least one of the following: company, product, service, retail location, and earcon length information.

3. The system of claim 1, wherein the user profile and preferences database is comprised of user and observationally supplied user profile information; and
   wherein the monitoring of the user and the user environment provides the observationally supplied user profile information.

4. The system of claim 1, wherein the user profile and preferences database is comprised of user biometric data; and
   wherein the user biometric data comprises one or more of gender of the user; age of the user; accent of the user; native language of the user; dialect of the user; socio-economic classification of the user; educational level of the user; and emotional state of the user.

5. The system of claim 1, wherein the user profile and preferences database is comprised of user preferences;
   wherein the user preferences includes types of companies, products, services the user wants to receive earcons about; and
   wherein the user preferences further comprise specified audio levels, lengths, and points in the usage of the communication device and the conversation for playing the earcons.

6. The system of claim 1, wherein the monitoring devices that are used to analyze user audio content utilizes speech recognition to detect and interpret conversational content;
   wherein based on the interpreted conversational content earcons are chosen for playback on the user's communications device.

7. The system of claim 1, wherein the monitoring of user audio content is used to determine pauses in the user's conversation; and
   wherein based on the determined pauses and their respective length, earcons are chosen for playback on the user's communications device.

8. The system of claim 1, wherein the monitoring of the user environment comprises tracking the location of the user; and
   wherein the tracking of user location comprises the use of at least one of the following: global positioning system (GPS) satellites and related electronic device chip sets within the communication devices, cellular phone infrastructure, and Internet gateways;
   wherein based on the user location an earcon is chosen for playback on the user's communications device; and
   wherein the communication devices comprise one or more of: cellular phones, fixed landline phone, mobile computing devices, and desktop computers; and
   wherein the cellular phones, the mobile computing devices, and the desktop computers are configured with voice over Internet protocol (VOIP).

9. An article comprising one or more computer-readable storage media containing instructions that when executed enable a computer to implement a method of implementing an earcon; wherein the method further comprises:
   forming a database of earcons;
   forming a user profile and preferences database;
   monitoring user audio content;
   monitoring user environment;
   selecting a series of earcons from the database of earcons based on the user profile and preferences database; and
   playing one or more earcons from the series of earcons on a user's communication device based on the monitored user audio content and user environment.

10. The article of claim 9, wherein the database of earcons is comprised of at least one of the following: company, product, service, retail location, and earcon length information.

11. The article of claim 9, wherein the user profile and preferences database is comprised of user and observationally supplied user profile information; and
    wherein the monitoring of the user environment provides the observationally supplied user profile information.

12. The article of claim 9, wherein the user profile and preferences database is comprised of user biometric data; and
    wherein the user biometric data comprises one or more of gender of the user; age of the user; accent of the user; native language of the user; dialect of the user; socio-economic classification of the user; educational level of the user; and emotional state of the user.

13. The article of claim 9, wherein the user profile and preferences database is comprised of user preferences;

wherein the user preferences includes types of companies, products, services the user wants to receive earcons about; and wherein the user preferences further comprise specified audio levels, lengths, and points in the usage of the communication device and the conversation for playing the earcons.

14. The article of claim 9, wherein the monitoring of user audio content comprises using a speech recognition system to detect and interpret conversational content; and wherein based on the interpreted conversational content earcons are chosen for playback on the user's communications device.

15. The article of claim 9, wherein the monitoring of user audio content is used to determine pauses in the user's conversation;

wherein based on the determined pauses and their respective length, earcons are chosen for playback on the user's communications device;

wherein the monitoring of the user environment comprises tracking the location of the user;

wherein the tracking of user location comprises the use of at least one of the following: global positioning system (GPS) satellites and related electronic device chip sets within the communication devices, cellular phone infrastructure, and Internet gateways and wherein based on the user location an earcon is chosen for playback on the user's communications device.

* * * * *